(12) United States Patent  
Mack

(10) Patent No.: US 6,788,746 B1  
(45) Date of Patent: Sep. 7, 2004

(54) SYSTEM AND METHOD OF DETERMINING THE FREQUENCY OF A COHERENT BURST SIGNAL

(75) Inventor: Andrew Paul Mack, Minneapolis, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 640 days.

(21) Appl. No.: 09/603,214

(22) Filed: Jun. 26, 2000

(51) Int. Cl.[7] ............................................. G06F 15/00
(52) U.S. Cl. ..................................................... 375/316
(58) Field of Search ................................. 375/316, 325, 375/326, 355; 367/87, 90, 95, 97

(56) References Cited

U.S. PATENT DOCUMENTS

| | | | |
|---|---|---|---|
| 4,363,242 A | * 12/1982 | Heyman ........................ 73/761 |
| 4,818,101 A | 4/1989 | Soreide et al. ............... 356/28.5 |
| 4,843,564 A | 6/1989 | Jenson ........................ 364/510 |
| 4,973,969 A | * 11/1990 | Jenson ........................ 342/189 |
| 5,164,784 A | 11/1992 | Waggoner ................... 356/28.5 |
| 5,237,516 A | * 8/1993 | Heyman ...................... 364/508 |
| 5,272,446 A | 12/1993 | Chalmers et al. ............ 329/304 |
| 5,272,513 A | 12/1993 | Vahala et al. ............... 356/28.5 |
| 5,289,391 A | 2/1994 | Ibrahim et al. .............. 364/570 |
| 5,291,081 A | 3/1994 | Takeuchi et al. ............. 328/522 |
| 5,453,834 A | * 9/1995 | Evenstad ..................... 356/345 |
| 5,689,474 A | * 11/1997 | Foss et al. ...................... 367/1 |
| 5,986,600 A | * 11/1999 | McEwan ...................... 342/28 |
| 6,009,380 A | * 12/1999 | Vecchio et al. ............. 702/142 |
| 6,215,226 B1 | * 4/2001 | Durkee ........................ 310/319 |
| 6,411,914 B1 | * 6/2002 | Mack ........................... 702/74 |
| 6,563,861 B1 | * 5/2003 | Krasny et al. ............... 375/150 |

* cited by examiner

Primary Examiner—Emmanuel Seyed  
Assistant Examiner—Dung X. Nguyen  
(74) Attorney, Agent, or Firm—James M. Rashid, Esq.; Calfee, Halter & Griswold LLP

(57) ABSTRACT

A method of determining accurately and expeditiously the frequency of a coherent signal from an incoming electrical signal is disclosed. The method comprises the steps of: generating a time sequence of sampled data signals from the incoming electrical signal; detecting the coherent signal in the time sequence of sampled data signals and generating a frequency estimate thereof; and determining the frequency of the detected coherent signal based on a function of the frequency estimate and a time segment of sampled data signals associated with the coherent signal. A system for performing the same is also disclosed.

43 Claims, 2 Drawing Sheets

SYSTEM AND METHOD OF DETERMINING THE FREQUENCY OF A COHERENT BURST SIGNAL

BACKGROUND OF THE INVENTION

The present invention is directed to the detection of coherent signals, in general, and more particularly, to a system and method of determining the frequency of a coherent signal detected from an incoming signal using a frequency estimate of the coherent signal to expedite the processing of a time segment of sampled data signals associated with the coherent signal.

In systems utilizing Doppler techniques for measuring parameters, such as a laser Doppler velocimeter (LDV) or a LIDAR, for example, coherent bursts of Doppler frequency shifted echo or return signals that are received intermittently and for brief durations are processed to measure each associated parameter. Not only is the detection of these coherent bursts from the incoming or received signal important, but an accurate and expeditious determination of the frequency of the detected burst is equally important. In an LDV or LIDAR system, for example, the signal frequency of the coherent burst is linearly proportional to a component of a velocity parameter being measured. This Doppler shifted frequency may range over several orders of magnitude approaching one gigahertz. Accordingly, the accurate and reliable frequency measurement of such coherent bursts with a low signal-to-noise ratio (SNR) is critical to accurate velocity measurements.

Because of the frequency ranges or bandwidths involved with such parameter measurements, real time signal processing of the coherent bursts is currently limited to crude frequency resolution. In general, a front end real time coherent burst detector, which may be of the type described in U.S. Pat. No. 4,973,969 or U.S. Pat. No. 5,289,391, for example, is coupled with a post-processor for processing the burst signals to obtain a high resolution frequency measurement. The coherent burst detector detects the coherent pulse in the incoming signal, collects data samples of the incoming signal over the time segment associated with the detected burst, and triggers the post-processor to process the collected data samples to determine the burst frequency. In order for the post-processor to determine the frequency of the burst accurately, it needs to process a large number of data samples with a commensurately sized spectral transform algorithm. However, speed of processing greatly diminishes as the size of the spectral transform increases to meet greater accuracy requirements creating longer processing times per burst. Accordingly, if a subsequent burst occurs during the processing of a burst, it may not be processed.

Currently, update rates for tracking the coherent bursts dictate the processing time allocated to process a burst signal to determine the frequency thereof at a specified accuracy or resolution. Therefore, update rates and accuracy requirements have a tendency to conflict with one another. That is, the processing time for each burst is set to ensure the processing of the bursts as they occur without loss of substantive burst information. As the update rate increases, the specified processing time decreases. On the other hand, the accuracy or resolution of the frequency measurement is not diminished. Accordingly, the post-processor has to maintain accuracy, but with a shorter processing time. Current coherent burst signal processing systems are unable to resolve this conflict.

Accordingly, what is desired is a system and method for measuring frequency of the coherent bursts at speeds and accuracy commensurate with the current and future demands of update rates and resolution. A processor that can process the sampled data of a coherent burst signal quickly and accurately will ensure that a minimum number of intermittent bursts are missed while waiting for the completion of a burst signal frequency measurement.

SUMMARY OF THE INVENTION

In accordance with one aspect of the present invention, a method of determining the frequency of a coherent signal from an incoming electrical signal comprises the steps of: generating a time sequence of sampled data signals from the incoming electrical signal; detecting the coherent signal in the time sequence of sampled data signals and generating a frequency estimate thereof; and determining the frequency of the detected coherent signal based on a function of the frequency estimate and a time segment of sampled data signals associated with the coherent signal.

In accordance with another aspect of the present invention, a system for determining the frequency of a coherent signal from an incoming electrical signal comprises: means for generating a time sequence of sampled data signals from the incoming electrical signal; means for detecting the coherent signal in the time sequence of sampled data signals and generating a frequency estimate thereof; and means for processing a time segment of the sampled data signals associated with the detected coherent signal and the generated frequency estimate to determine the frequency of the detected coherent signal.

DETAILED DESCRIPTION OF THE INVENTION

Figure 1:
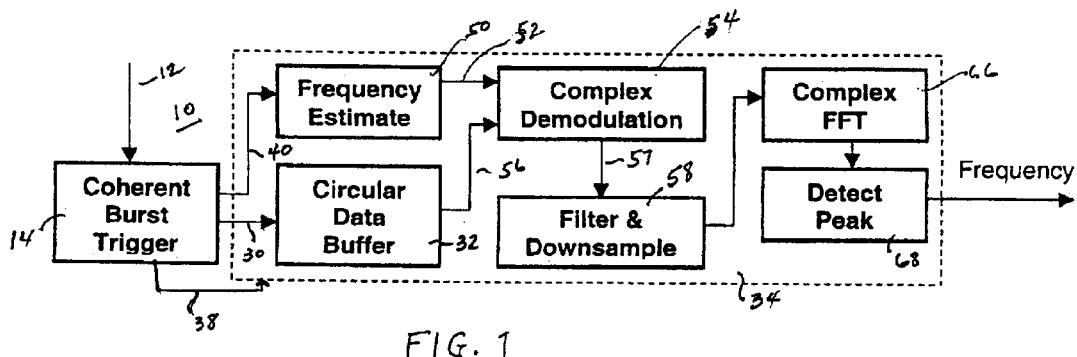
FIG. 1 is a block diagram schematic of a coherent burst frequency measurement system suitable for embodying the principles of the present invention.

FIG. 1 is a block diagram schematic of a coherent burst frequency measurement system 10 suitable for embodying the principles of the present invention. The system of FIG. 1, by way of example, may be part of a laser Doppler velocimeter (LDV) such as described in U.S. Pat. No. 4,818,101 or U.S. Pat. No. 5,272,513, for example, or part of continuous wave Doppler LIDAR such as described in the U.S. Pat. No. 5,164,784, for example. However, it is understood that the embodiment of FIG. 1 is not limited in application to such systems, but rather may be used in any system in which a received or incoming signal includes coherent burst signal having a frequency which is used in the measurement of a parameter. In the present embodiment, an incoming signal 12 is received by a coherent burst trigger circuit 14. The incoming signal 12 may be a conditioned electrical signal converted from a front end optics receiver of a LDV or LIDAR, for example. Signal 12 may have been bandpass filtered to remove any low frequency signal components caused by the optics pedestal, for example, and any high frequency noise signal components. In the present embodiment, the incoming signal may range from substantially 12 to 188 MHz, for example. Also, by way of example, the coherent burst circuit 14 may be of the type described in the copending U.S. patent application bearing application Ser. No. 09/450,317, entitled "System and Method For Coherent Signal Detection Using Wavelet Functions", and assigned to the same assignee as the instant application, which is hereby incorporated by reference in its entirety into the instant application. But, it is further understood that other coherent burst detector circuits, like those described in U.S. Pat. Nos. 4,973,969, 5,289,391 and 4,843,564, for example, may be used in the present embodiment without deviating from the principles of the present invention.

Figure 6:
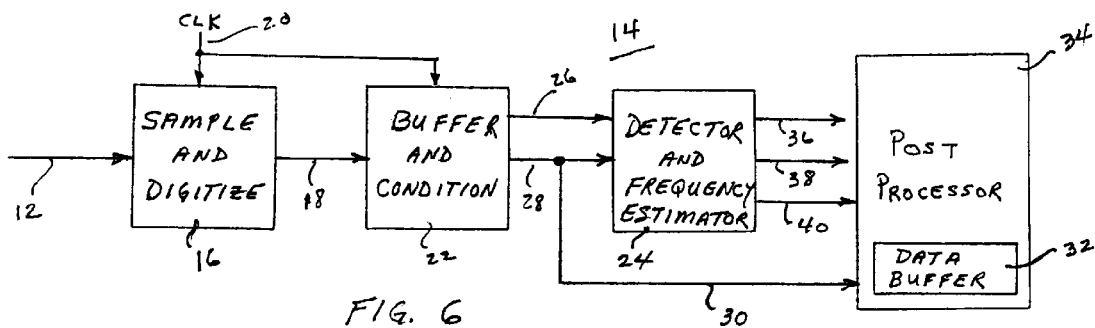
FIG. 6 is a block diagram schematic of a coherent signal detector suitable for use in the embodiment of FIG. 1.

The coherent burst trigger or detection circuit 14 is depicted in greater detail in the block diagram schematic of FIG. 6. Referring to FIG. 6, the incoming electrical signal 12 which includes coherent signal bursts intermittently and for short durations is sampled and digitized by the circuit 16 to provide a time sequence of digital data samples representative of the incoming electrical signal over signal line 18. A clock signal 20 governs the sampling and digitization of circuit 16. The present embodiment operates with a sampling rate of seven hundred and fifty (750) megahertz (MHz) to produce a time sequence of 750 million data samples of the incoming signal per second. In addition, the digitization may be a one-bit or multi-bit analog-to-digital conversion process depending on the particular application. While digitization is used because the downstream processing of the present embodiment includes digital processing circuitry, it is understood that the step of digitization may be omitted if suitable analog circuitry is embodied for the downstream processing of the data samples. The time sequence of data samples is buffered and conditioned in circuit 22 for downstream processing in a coherent signal detector circuit 24. Circuit 22 may buffer the data samples to accommodate the slower processing rate of the circuit 24 and may further offer voltage signals compatible with the processor 24. The clock signal 20 may also be conditioned and passed along to circuit 24 over signal line 26. However, it is further understood that these steps may be also omitted depending upon the application and processing rate of the downstream circuitry.

The conditioned data samples are provided to the circuit 24 over a signal line 28 for processing therein and may be passed along over signal line 30 to a data buffer 32 which may be part of a post-processor circuit 34, for example. In the present embodiment, the detector circuit 24 processes the data samples to generate frequency bins or ranges having collective energy levels. When the energy level of a frequency bin exceeds a predetermined reference level, the circuit 24 indicates the start of a coherent burst signal and when such energy level falls below the predetermined reference level, the end of the burst signal is indicated. The frequency bin or range triggering the burst signal indications is considered in the present embodiment as the estimate of the frequency of the detected coherent burst. Also, in the present embodiment, the conditioned clock signal may be passed along to the processor 34 over signal line 36 for processing synchronization and rate purposes. The start and stop detection indications of the coherent signal may be supplied to the processor 34 over a trigger signal line 38 along with the corresponding frequency estimate over a signal line 40 for further processing to measure an accurate frequency of the detected coherent burst signal. More specifically, circuit 24 may be a programmable gate array that is programmed to process the data samples using a Wavelet function, Fourier function or other spectral transformation algorithm to generate uniformly eight frequency bins over a frequency range of 12 to 188 MHz in which case, each frequency bin contains a frequency range of (188−12)/8 MHz. A digital code representing the frequency bin of the detected coherent signal is provided over signal line 40 as representing the frequency estimate. For a more detailed description of such an embodiment, reference is made to the above identified U.S. patent application Ser. No. 09/450,317. It is understood that the aforementioned number of frequency bins and frequency ranges thereof are merely described by way of example and that other frequency bins and ranges may be used for frequency estimates without deviating from the principles of the present invention.

Figure 7:
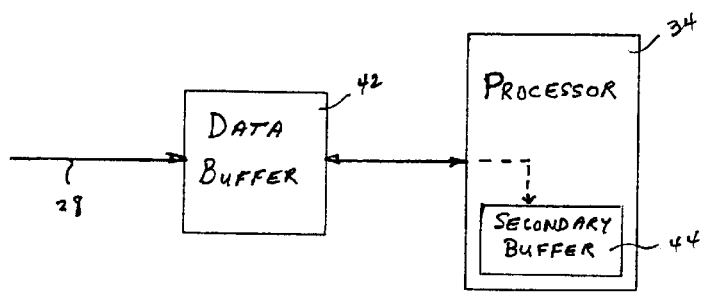
FIG. 7 is a block diagram schematic of an alternate embodiment of a data buffer for use in the embodiment of FIG. 1.

In the present embodiment of FIG. 6, the processor 34 may be triggered by the start indication of line 38 to start storing data samples of the time sequence received over line 40 into the data buffer 32 and triggered to stop storing such data samples upon reception of a stop indication over signal line 38. At the stop indication, the data buffer 32 will have stored therein a time segment of data samples associated with the current detected coherent signal which the processor 34 will process along with the corresponding frequency estimate of line 40 to determine the frequency of the detected coherent signal. Alternatively, as depicted by the block diagram schematic of FIG. 7, a data buffer 42, which may be of the circular variety, stores continuously a time segment of the time sequence of data samples in a sliding time window fashion. When the processor 34 receives the stop indication over line 38 or some other similar indication, it loads a secondary data buffer 44 with the immediate time segment contents of the buffer 42. This data loading of the secondary buffer may take place at such a rate so as to not interfere with the data sample collection of buffer 42 which continues to store data samples of the incoming signal in the time sequence. Both or one or the other of the data buffers 42 and 44 may be part of the processor 34 or be a separate unit therefrom without deviating from the principles of the present invention.

Reference is made back to the schematic of FIG. 1 for a description of the processing functions of the processor 34 which may be, for the purposes of the present embodiment, an integrated circuit digital signal processor of the type manufactured by Texas Instrument bearing model number TMS320C6201, for example. The coded frequency estimate signal 40 is received by the processor 34 and processed by a functional block 50 which may operate to generate a modulation frequency signal 52 governed by the clock rate 36 (not shown). The data samples of the time segment associated with the detected coherent signal being stored in the circular buffer 32 are retrieved therefrom over line 56 for demodulation by the modulation frequency signal 52 in the functional block 54 governed by the clock rate 36. The modulation frequency is representative of the coded frequency estimate of the detected coherent signal. In the present embodiment, the modulation frequency $f_c$ is chosen to be substantially the center frequency of the range of frequencies of the frequency estimate having a complex demodulation function d(t) as follows:

$$d(t)=\cos(2\pi f_c t)+i\,\sin(2\pi f_c t). \qquad \text{Eq. 1}$$

Thus, demodulating the data samples of the time segment of the incoming signal retrieved from the data buffer 32 results in the demodulation signal $S_d(t)$ according to the following expression:

$$S_d(t)=S_0(t)\times d(t), \qquad \text{Eq. 2}$$

where $S_0(t)$ is the time signal represented by the sampled data signal of the time segment, and $S_d(t)$ is a complex signal. It is understood that a frequency other than the center frequency or even a composite of frequencies may be used to represent the frequency estimate without deviating from the principles of the present invention.

Figure 2:
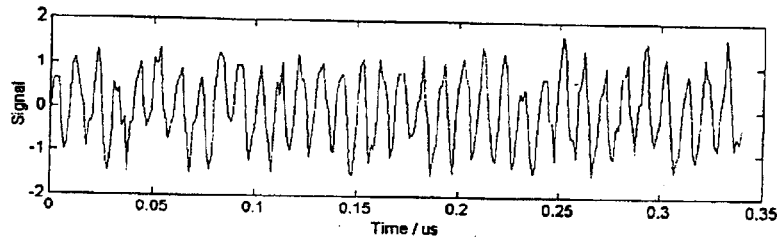
FIG. 2 is a time graph exemplifying a time segment portion of an incoming signal associated with a coherent burst signal.
Figure 3:
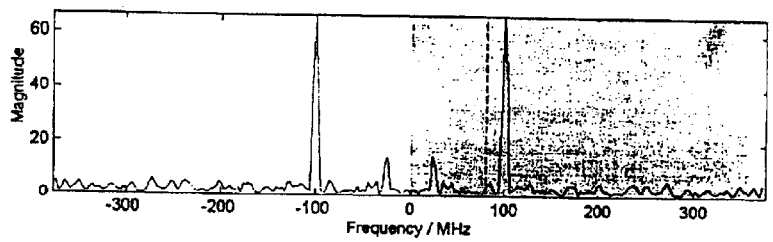
FIG. 3 is a graph exemplifying a frequency spectrum of the time segment portion illustrated in FIG. 2.
Figure 4:
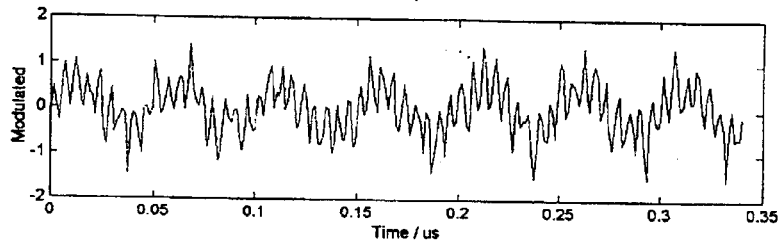
FIG. 4 is a time graph exemplifying a demodulated time segment associated with the coherent signal.
Figure 5:
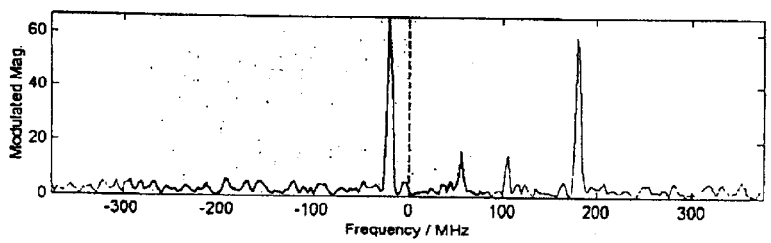
FIG. 5 is a graph exemplifying a frequency spectrum of the demodulated time segment illustrated in FIG. 4.

By way of example, the time graph of FIG. 2 illustrates a time segment of the incoming signal associated with the detected coherent signal and FIG. 3 represents the spectral make up thereof with substantial energy levels at the points 25 MHz and 100 MHz. Suppose for the present example, the frequency bin of the frequency estimate had a center frequency of approximately 80 MHz, then the time signal of FIG. 2 is modulated with a modulation frequency signal of 80 MHz to yield a complex modulation signal which may exhibit the characteristics of the real waveform exemplified in FIG. 4 and which has a spectral make up shown by the frequency spectrum of FIG. 5. Note that in the spectrum of FIG. 5, 80 MHz is transformed or shifted to baseband or zero frequency and the frequency spectrum surrounding 80 MHz in FIG. 3 is centered about baseband in FIG. 5. Accordingly, the energy peak at 100 MHz of the time segment is transformed to –20 MHz in the demodulation signal. In addition to the aforementioned frequency shift, the spectrum of the demodulated signal depicted in FIG. 3 is also rotated 180° about the frequency $f_c$ shown by the dashed vertical line in FIG. 3. Accordingly, the graph of FIG. 5 depicts the results of the 180° rotation about the dashed line and the shifting of the dashed line to baseband or zero frequency. Now that frequency of the peak energy of interest is closer to zero frequency, i.e. –20 MHz, a much lower Nyquist frequency may be used to resolve the frequency associated with this peak.

Figure 8:
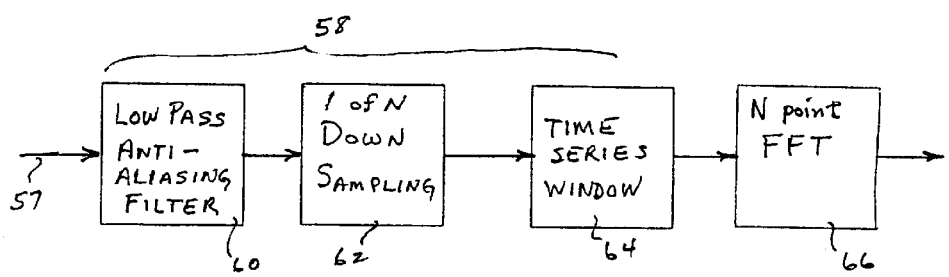
FIG. 8 is a block diagram schematic of a filter and downsampling function suitable for use in the embodiment of FIG. 1.

Next, the demodulation signal 57 is low pass filtered and downsampled in the functional block 58. Reference is made to the block diagram schematic of FIG. 8 for a more detailed description of the functions of block 58. Referring to FIG. 8, a low pass filtering of the demodulation signal 57 is performed in block 60 wherein all of the higher frequency components, both positive and negative, of the complex demodulation signal 57 are discarded to prevent the occurrence of anti-aliasing among other effects. Without the low pass filter, energy of the higher frequency content may show in the downsampling processing and have an affect on the resulting frequency determination. In the present embodiment, the cut-off frequency of the low pass filter is based on the frequency estimate. For example, the frequency range of the estimate may become the range of the low pass filter. In other words, the center frequency and frequency range of the frequency estimate may be used as the modulation frequency and low pass filter cut off frequency, respectively. Any conventional sliding average digital filter algorithm may be used to embody the low pass filter function. For the present embodiment, a suitable digital filter algorithm comprises the COMB filter. In block 62, a downsampling of the filtered signal is performed wherein the circuit keeps or passes for processing only one of N filtered complex data samples from block 60. For the present example, N is chosen to be 16, i.e. the block 62 passes only every 1 of 16 real and imaginary data samples for further processing.

Note that if the time segment data buffer 32 started with 4096 data samples, with the downsampling of 1 of 16, only 256 data samples would be passed for further processing. Next, in block 64, a time-series window function may be applied to the data samples passed by the downsampler 62 to reduce any spectral leakage of the transformed data. A suitable function for these purposes is a Hanning time-series window. Once the filtering and downsampling of block 58 are performed, a spectral transformation of the remaining data samples is conducted in a functional block 66 to generate a spectrum of frequency signals within the narrow bandwidth of the low pass filter. The spectral transformation may be of a size commensurate with the number of remaining data samples, i.e. if the remaining data samples is 256, then a 256 point spectral transformation would be performed in block 66. Again, any discrete spectral transformation, like a Fourier or Wavelet function algorithm, for example, is considered suitable for the present embodiment. For this example, a 256 point Fast Fourier transform (FFT) algorithm is used to perform the spectral transformation yielding 256 frequency components from the 256 data samples provided by block 62. Since the transformation is complex, all 256 frequency components centered about the baseband will be unique. The frequency of the detected coherent signal may then be determined from results of the spectral transformation.

Figure 9:
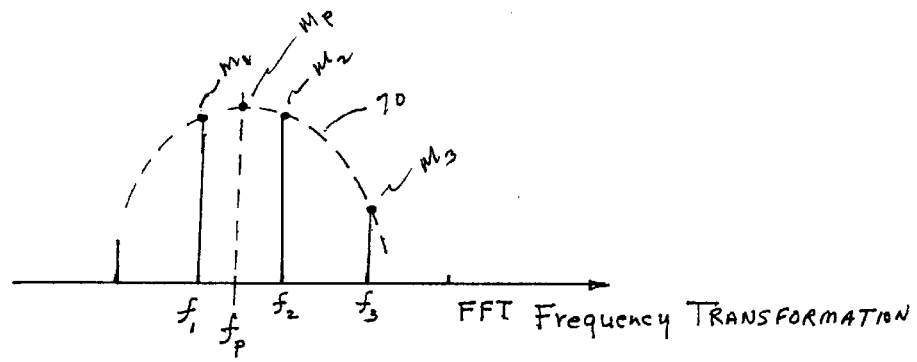
FIG. 9 is an illustration of a curve fitting method for interpolating between frequency signals of a spectral transformation.

In the present embodiment, the peak or maximum spectral magnitude of the spectral transformation may be determined and used for determining the coherent signal frequency in block 68. Alternatively, some curve fitting algorithm could be used to improve resolution by interpolating between the discrete frequency points of the spectral transformation such as that shown in the graphical illustration of FIG. 9. Referring to FIG. 9, suppose that frequency points $f_1$, $f_2$, and $f_3$ are exemplary spectral transformation frequencies with respectively corresponding magnitudes $M_1$, $M_2$ and $M_3$, then a suitable curve for fitting the magnitudes is shown by the dashed line 70. A peak or maximum magnitude $M_p$ of the curve 70 provides for the frequency $f_p$ which lies between the frequency points $f_1$, and $f_2$, thus providing improved resolution in the frequency determination process. Such curve fitting may be accomplished by a second order polynomial expression, a spline or other similar expression, for example. Thereafter, the original peak frequency $f_p$ is recovered from the demodulated peak frequency $f_d$ and used as a measure of the frequency of the coherent signal using the following expression:

$$f_p=f_c=f_d, \qquad \text{Eq. 3}$$

where $f_c$ is the modulation frequency determined from the frequency estimate.

In summary, the foregoing described embodiment provides a unique system and method for determining the frequency of a coherent signal detected from an incoming signal with both accuracy and speed. A time segment of data samples of the incoming signal associated with a detected coherent burst signal is demodulated with a frequency modulation signal representative of a frequency estimate of the coherent signal to shift the frequency spectrum of the time segment to lower frequencies which may be centered about baseband or zero frequency. The data samples of the complex demodulated time segment are low pass filtered and downsampled to remove undesirable higher-frequency components and to reduce the sampling rate and spectral transform size. The cut-off frequency of the low pass filter may be based on the frequency range of the estimate. Accordingly, a relatively smaller and consequently, faster discrete spectral transform is applied to the remaining samples to yield a spectrum of discrete frequency signals commensurate with the number of data samples being transformed. A frequency corresponding to the maximum spectral magnitude of the transformation is converted back to the original frequency domain based on the modulation frequency and used a measure of the coherent signal frequency. Curve fitting may be used to interpolate between the discrete frequencies of the spectral transformation to improve the resolution of the frequency determination.

While the present invention has been described herein above in connection with one or more embodiments, it is understood that it should not be limited in any way, shape or form to any specific embodiment but rather construed in broad scope and breadth in accordance with the recitation of the set of claims appended hereto.

What is claimed is:

1. A method of determining the frequency of a coherent burst echo signal from an incoming electrical signal, said method comprising the steps of:
   generating a time sequence of sampled data signals from said incoming electrical signal;
   detecting said coherent burst echo signal in said time sequence of sampled data signals and generating a frequency estimate thereof; and
   determining the frequency of said detected coherent burst echo signal by demodulating a time segment of sampled data signals associated with the detected coherent burst echo signal with a frequency modulation signal representative of the frequency estimate of the coherent burst echo signal.

2. The method of claim 1 wherein the frequency estimate is generated as a range of frequencies.

3. The method of claim 2 wherein the frequency estimate is generated as one of a predetermined number of ranges of frequency that collectively represent the bandwidth of frequencies of the coherent burst echo signal.

4. The method of claim 2 wherein the time segment of sampled data signals associated with the detected coherent burst echo signal is demodulated with a frequency modulation signal representative substantially of a center frequency of the estimated range of frequencies of the coherent signal.

5. The method of claim 1 wherein the step of demodulating renders a time segment of sampled data signals with a frequency content centered about a reference frequency.

6. The method of claim 5 wherein the reference frequency is substantially zero frequency.

7. The method of claim 5 including the step of low pass filtering the demodulated time segment of sampled data signals.

8. The method of claim 5 including the step of downsampling the demodulated time segment of sampled data signals.

9. The method of claim 8 including the step of spectrally transforming the downsampled time segment of sampled data signals.

10. The method of claim 9 wherein the downsampled time segment of sampled data signals is spectrally transformed by a Fourier transformation.

11. The method of claim 9 wherein the downsampled time segment of sampled data signals is spectrally transformed by a Wavelet function transformation.

12. The method of claim 9 including the step of determining the frequency of the coherent signal from the spectral transformation.

13. The method of claim 12 wherein the frequency of the coherent burst echo signal is determined by determining a peak amplitude of the spectral transformation.

14. The method of claim 8 including the step of applying a time-series window to the downsampled time segment of sampled data signals to reduce spectral leakage thereof.

15. The method of claim 5 including the step of spectrally transforming the demodulated time segment of sampled data signals.

16. The method of claim 15 wherein the demodulated time segment of sampled data signals is spectrally transformed by a Fourier transformation.

17. The method of claim 15 wherein the demodulated time segment of sampled data signals is spectrally transformed by a Wavelet function transformation.

18. The method of claim 15 including the step of determining the frequency of the coherent burst echo signal from the spectral transformation.

19. The method of claim 18 wherein the frequency of the coherent burst echo signal is determined from a peak amplitude of the spectral transformation.

20. A system for determining the frequency of a coherent burst echo signal from an incoming electrical signal, said system comprising:
   means for generating a time sequence of sampled data signals from said incoming electrical signal;
   means for detecting said coherent burst echo signal in said time sequence of sampled data signals and generating a frequency estimate thereof; and
   processing means for demodulating a time segment of said sampled data signals associated with the detected coherent burst echo signal with a frequency modulation signal representative of said frequency estimate to determine the frequency of the detected coherent burst echo signal.

21. The system of claim 20 wherein the generating means includes means for sampling and digitizing the incoming electrical signal to generate a time sequence of sampled digital data signals.

22. The system of claim 20 wherein the processing means includes a data buffer for storing the time segment of sampled data signals.

23. The system of claim 22 wherein the data buffer comprises a circular data buffer.

24. The system of claim 23 wherein the processing means includes a secondary buffer for storing the time segment of sampled data signals associated with the detected coherent burst echo signal from the circular data buffer for processing, whereby the circular buffer continues to store sampled data signals of the time sequence.

25. The system of claim 20 wherein the processing means comprises a digital signal processor.

26. The system of claim 25 wherein the digital signal processor comprises an integrated circuit including a data buffer for storing the time segment of sampled data signals.

27. The system of claim 20 wherein the detecting means includes means for generating a trigger signal upon detection of the coherent burst echo signal; and wherein the processing means is activated by said trigger signal to process the time segment of the sampled data signals associated with the detected coherent burst echo signal and the corresponding frequency estimate to determine the frequency of the detected coherent burst echo signal.

28. The system of claim 20 wherein the processing means includes:

means for demodulating the time segment of sampled data signals with a frequency modulation signal representative of the frequency estimate of the coherent burst echo signal to render a demodulated time segment of sampled data signals with a frequency content centered substantially about a reference frequency;

means for spectrally transforming said demodulated time segment of sampled data signals to render a spectrum of discrete frequency signals; and means for determining the frequency of the coherent burst echo signal from the spectrum of discrete frequency signals.

29. The system of claim 28 wherein the demodulating means includes filter means for anti-aliasing the demodulated time segment of sampled data signals.

30. The system of claim 29 wherein the filter means comprises a comb filter.

31. The system of claim 28 wherein the demodulating means includes a means for downsampling the demodulated time segment of sampled data signals to render a smaller number of data signals of the time segment.

32. The system of claim 28 wherein the transforming means includes a Discrete Fourier transform algorithm.

33. The system of claim 28 wherein the transforming means includes a Wavelet function transform algorithm.

34. The system of claim 28 wherein the determining means includes means for determining a frequency associated with a peak amplitude of the discrete frequency signals.

35. The system of claim 29 wherein the determining means includes means for curve fitting the amplitudes of the discrete frequency signals and identifying a frequency substantially at the peak of the curve as the frequency of the coherent burst echo signal.

36. The system of claim 28 wherein the frequency estimate comprises a range of frequencies and the demodulation frequency signal comprises substantially the center frequency of the estimated range of frequencies; and wherein the demodulating means includes low pass filter means with a cut-off frequency based on the estimated range of frequencies for filtering the demodulated time segment of sampled data signals.

37. The system of claim 28 wherein the demodulating means includes means for downsampling the demodulated time segment of sampled data signals to render a reduced number of sampled data signals of the time segment; and wherein the transforming means includes discrete spectral transforming means of a number of points commensurate with said reduced number of sampled data signals.

38. The system of claim 28 wherein the determining means includes means for determining a frequency associated with a peak amplitude from the amplitudes of the discrete frequency signals; and means for converting the peak amplitude frequency to the frequency of the coherent burst echo signal using the center frequency of the estimated range of frequencies of the coherent burst echo signal.

39. The system of claim 28 wherein the determining means includes means for determining a frequency associated with a peak amplitude from the amplitudes of the discrete frequency signals; and means for converting the peak amplitude frequency to the frequency of the coherent burst echo signal using the frequency estimate of the coherent burst echo signal.

40. The system of claim 20 wherein the coherent burst echo signal comprises a Doppler frequency shifted signal.

41. The system of claim 20 wherein the coherent burst echo signal comprises a burst frequency signal commensurate in time with the time segment.

42. The system of claim 20 wherein the system is part of a laser Doppler velocimeter; and wherein the incoming electrical signal comprises a signal converted from a received laser beam echo.

43. The system of claim 20 wherein the system is part of a LIDAR system; and wherein the incoming electrical signal comprises a signal converted from a received laser beam echo.

* * * * *

UNITED STATES PATENT AND TRADEMARK OFFICE
CERTIFICATE OF CORRECTION

PATENT NO. : 6,788,746 B1
DATED : September 7, 2004
INVENTOR(S) : Andrew Paul Mack It is certified that error appears in the above-identified patent and that said Letters Patent is hereby corrected as shown below:

Column 9,
Line 31, "claim 29" should read -- claim 28 --.

Signed and Sealed this

Fourth Day of January, 2005

JON W. DUDAS
*Director of the United States Patent and Trademark Office*